Figure 1:
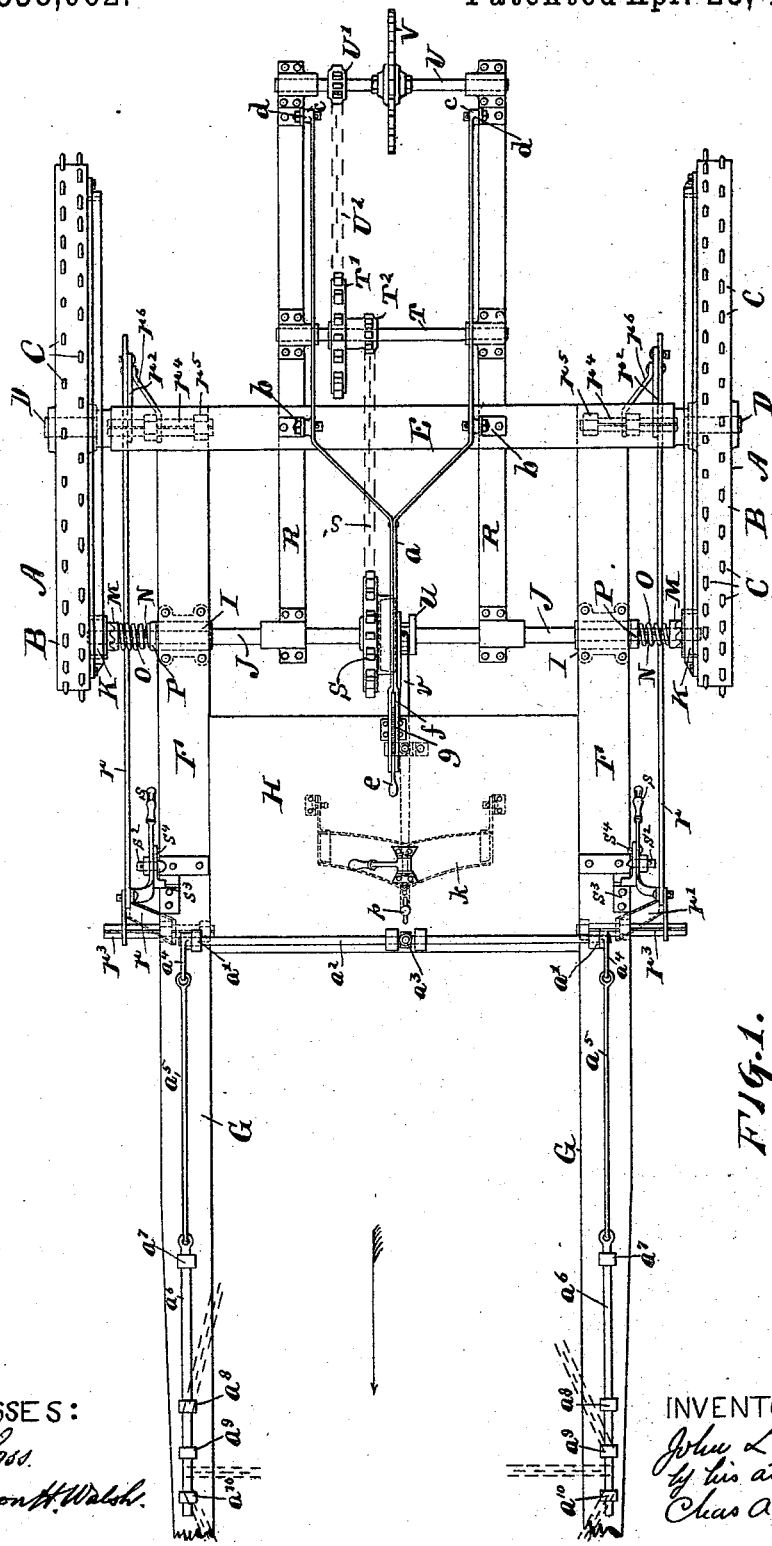

(No Model.) 2 Sheets—Sheet 1.

J. L. BIRD.
ICE HARVESTING MACHINE.

No. 538,062. Patented Apr. 23, 1895.

WITNESSES:
H. V. Loss.
Stevenson H. Walsh.

INVENTOR
John L. Bird
by his attorney
Chas. A. Ritter.

(No Model.) 2 Sheets—Sheet 2.
J. L. BIRD.
ICE HARVESTING MACHINE.
No. 538,062. Patented Apr. 23, 1895.
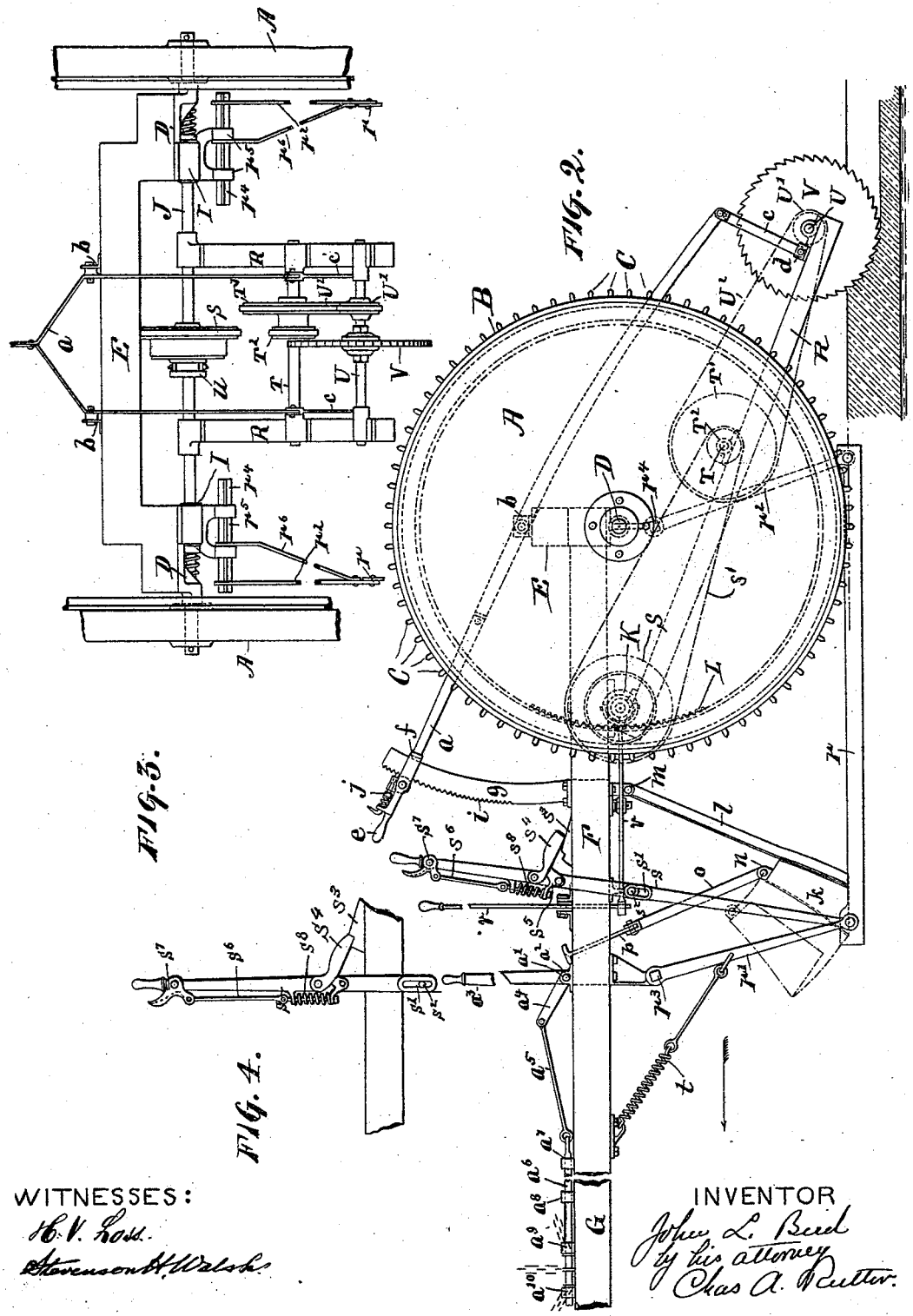
WITNESSES:
H. V. Ross
Stevenson H. Walsh
INVENTOR
John L. Bird
by his attorney
Chas. A. Reutter

UNITED STATES PATENT OFFICE.

JOHN L. BIRD, OF CLAYMONT, DELAWARE.

ICE-HARVESTING MACHINE.

SPECIFICATION forming part of Letters Patent No. 538,062, dated April 23, 1895.

Application filed October 17, 1894. Serial No. 526,156. (No model.)

*To all whom it may concern:*

Be it known that I, JOHN L. BIRD, a citizen of the United States, and a resident of Claymont, in the county of New Castle and State of Delaware, have invented certain new and useful Improvements in Ice-Harvesting Machines, of which the following is a specification.

My invention relates to improvements in ice harvesting machines and more particularly to improvements in that class of ice harvesting machines which are adapted to be drawn by a horse and which consist of a truck the wheels of which run upon the ice and which drive, through suitable mechanism, a saw which cuts or scores the ice.

My improvements consist in the arrangement and combination of parts as hereinafter fully described.

In the accompanying drawings forming part of this specification, and in which similar letters of reference indicate similar parts throughout the several views, Figure 1, is a plan of an ice harvesting machine embodying my improvements; Fig. 2, a side elevation of Fig. 1; Fig. 3, a rear elevation, partly broken away, of Fig. 1, and Fig. 4, a side elevation of upper part of lever and its connected parts showing the position of pawl when lever is raised.

A are traction wheels the centers of which are preferably constructed of wood and which are furnished with metal tires B which carry points or teeth C which engage the ice and prevent the wheels from slipping as the machine is drawn along.

D are the axles upon which the wheels A turn.

E is a bolster to which the axles D are secured; F, a frame one end of which is secured to and carried by bolster E and the other, or forward, end of which forms or is furnished with shafts G between which the animal that draws the machine is placed.

H is a platform carried by frame F.

Carried in suitable bearings I carried by frame F is a shaft J loose upon the outer ends of which are pinions K which are adapted to mesh with and be driven by internal gears L which are carried by the wheels A. Upon the hubs of pinions K is one part of a clutch M, the other part of which is secured to the shaft J by a feather N, or some other equivalent device. A spring O on the shaft J, one end of which bears against a fixed collar P and the other against the clutch, forces the inner part of the clutch against the outer part and causes, through pinions K and gears L, the turning of shaft J when the machine is moved forward and permits the clutches to disengage when the machine is moved backward.

R is a frame the forward end of which is pivotally connected to and carried by shaft J; S, a sprocket wheel loose on shaft J.

$u$ is a clutch by means of which wheel S may be secured to shaft J.

$v$ is the handle by means of which clutch $u$ may be operated.

T is a shaft carried by frame R; T', T$^2$, sprocket wheels carried by shaft T; S', a sprocket chain connecting sprocket wheels S and T$^2$; U, a shaft carried by rear end of frame R; U', a sprocket wheel fast to shaft U; U$^2$, a sprocket chain connecting sprocket wheels T' and U'; V, a saw carried by shaft U.

The construction and operation of the several parts above mentioned are old and well known in connection with ice harvesting machines and need not be described in detail here.

$a$ is a lever which is pivoted to suitable supports $b$ carried by bolster E and the rear end of which is pivotally attached to the upper end of a link or links $c$ the lower ends of which are pivoted to frame R as at $d$. The forward end of lever $a$ is furnished with an operating handle $e$ and is further furnished with a slot or keeper $f$ through which passes an arc $g$ which is carried by platform H. Upon arc $g$ is a rack $i$, and carried by lever $a$ is a spring actuated pawl or bolt $j$ adapted to engage with the teeth of rack $i$. The operator, who stands on platform H, can depress or elevate the lever $a$ and thereby raise or lower the frame R and saw V at will.

The lever $a$ is secured at any desired point by means of the spring actuated bolt $j$ engaging the teeth of rack $i$.

It frequently happens that snow lies upon the ice and interferes with the action of the saw V. In order to clear this snow away from the path of the saw I have furnished my machine with a snow plow $k$ the center of which is placed directly in front of the saw and which is adapted to throw the snow to either side of the saw.

The snow plow is carried by arms $l$ which are pivoted to the bottom of platform H, as at $m$, and it has pivoted to it at $n$ a link $o$ to the upper end of which is pivoted a link $p$ which passes up through platform H and by means of which the snow plow my be raised clear of the ice when not in use.

When it is desired to raise the snow plow the link $p$ is raised until its lower end is clear of the top of platform H. The link $p$ is then pushed over until it is horizontal, or lies along the top of the platform, when it serves to hold the link $o$ and the snow plow up.

$r$ are guide plates, one upon each side of the machine, which are adapted to run in the groove last cut by the saw V and thus insure the saw cuts being parallel and the same, or any desired, distance from one another; but one of the guide plates is in use at one time. When the machine is moving as indicated by the arrow in Fig. 1 the guide plate upon its left side is in use. When the machine is turned and run in the opposite direction the guide plate upon the right side is used while that upon the left side is raised. The guide plates $r$ are hung upon arms $r'$, $r^2$, the lower ends of which are pivotally secured to the guide plates and the upper ends of which are carried by short shafts $r^3$, $r^4$ which are carried by and free to turn in suitable bearings $r^5$ carried by the under part of frame F.

$r^6$ are braces one end of which are carried by shafts $r^4$ and the under end of which are secured to the lower ends of arms $r'$, $r^2$ or to the guide plates $r$.

The shafts $r^4$ are, outside of their bearings $r^5$, square or furnished with a feather so as to prevent the arms and braces from turning upon them and to permit these braces to be moved in or out upon them so that they may be adjusted to cut, in connection with saw V, blocks of ice of greater or lesser width.

$s$ are levers the lower ends of which are pivotally attached to, or near, the forward ends of guide plates $r$ and by means of which the guide plates may be raised or lowered. The levers $s$ are furnished with a slot $s'$ through which passes a pin $s^2$ carried by the frame F. Upon the upper part of frame F is a catch or notch $s^3$, and pivoted upon the levers $s$ are pawls $s^4$ the lower or free ends of which are adapted to engage with the catches $s^3$. $s^5$ are triggers pivoted to levers $s$; $s^6$, rods leading from trigger $s^5$ to bell crank levers $s^7$ pivoted to the upper part of levers $s$. $s^8$ is a spring one end of which bears against trigger $s^5$ and the other against a fixed point or projection on the lever $s$ and which returns the triggers to their original position after having been operated to throw the catch $s^4$ out of the notches $s^3$.

When the guide plates are lowered the lever $s$ and the guide plates are supported by pin $s^2$. When it is desired to raise the guide plates the upper end of lever $s$ is moved forward and as this is done the lever $s$ is moved up and the pawl $s^4$ falls into notch $s^3$ and holds the several parts in their raised positions. The upward movement of the lever $s$ is caused by the movement of the guide plate $r$ which is hung on arms $r'$, $r^2$ and which cause it to remain parallel to frame F in its several positions.

In order to lower the guide plate the upper arm of bell crank $s^7$ is moved in, which causes its lower end to be raised and to draw up link or rod $s^6$ which throws trigger $s^5$ outward against pawl $s^4$ throwing this pawl out of notch $s^3$ and allowing the lever $s$ and its connected parts to fall.

The position of the upper part of lever $s$ when lowered is shown in Fig. 2, when raised in Fig. 4.

$t$, Fig. 2, is a spring one end of which is connected to frame F and the other to arm $r'$ or to a link or rod connected to this arm, and the purpose of which is to allow the arms $r'$, $r^2$ and guide plate $r$ to yield when striking an obstruction and to return them to their first positions after the obstruction is passed.

Carried in suitable journals $a'$ upon the front of the platform H is a shaft $a^2$ which is furnished with an upright lever $a^3$ by means of which it may be turned in its bearings. Upon the ends of shaft $a^2$ are cranks $a^4$ to the outer ends of which are attached chains or rods $a^5$ the other ends of which are attached to rods $a^6$ which pass through keepers $a^7$, $a^8$, $a^9$, $a^{10}$, upon the upper part of the shafts of the machine.

The tug chains of the harness of the animal which draws the device are passed over the forward keeper $a^{10}$, the chain from the breech band of the harness over the keeper $a^9$, and are held in placed by the rod $a^6$ passing over them. The supporting chain which passes over the saddle and which holds the shafts up is secured by the rod $a^6$ which passes through its ends. This latter chain is placed between keepers $a^{10}$, $a^9$, as shown in Figs. 1 and 2.

Should the animal or the machine break through the ice the operator on the platform draws back lever $a^3$ which through cranks $a^4$ and links $a^5$ draws back rod $a^6$ and all the chains by means of which the animal is secured to the machine are instantly loosened and the animal is free.

The levers by means of which the several parts of the machine are operated are all within easy reach of the operator who stands upon platform H.

As much wood as possible enters into the construction of my machine so that it may not sink should it break through the ice.

Having thus described my invention, I claim as new and desire to secure by Letters Patent—

1. In an ice harvesting machine, in combination, a guide plate, arms for carrying said guide plate one end of which are pivotally attached to and carried by the frame of said machine and the other end of which are pivotally attached to said guide plate, a lever for raising or lowering said guide plate the lower end of which is pivoted to said guide plate, a slot in said lever, a pin carried by the frame of the machine and passing through said slot in said lever and by means of which said lever is attached to said frame, a pawl carried by said lever, a notch on said main frame adapted to be engaged by said pawl, and means for disengaging said pawl from said notch, substantially as and for the purposes set forth.

2. The combination in an ice harvesting machine of the guide plate $r$, arms which carry said guide plate one end of which are pivotally attached to the frame of said machine and the other to the said guide plate, and the slotted lever $s$ by means of which said plate may be raised or lowered, of a pawl pivoted to said lever, a trigger pivoted to said lever and adapted to engage said pawl, a rod one end of which is secured to said lever and the other to one arm of a bell crank pivoted to said lever, said bell crank, a spring for returning said trigger to its normal position, and a notch on the main frame of the machine adapted to be engaged by said pawl in order to hold said lever and guide plate in their raised positions.

3. The combination in an ice harvesting machine of the guide plate $r$ and the arms which carry it, of a spring $t$ one end of which is secured to the forward carrying arm of said guide plate and the other to the main frame of the machine, substantially as and for the purposes set forth.

JOHN L. BIRD.

Witnesses:
STEVENSON H. WALSH,
CHAS. A. RUTTER.